(12) United States Patent
Suzuki

(10) Patent No.: US 11,991,330 B2
(45) Date of Patent: May 21, 2024

(54) SERVER, COMMUNICATION SYSTEM, NON-TRANSITORY COMPUTER-READABLE RECORDING MEDIUM STORING COMPUTER-READABLE INSTRUCTIONS FOR SERVER AND CONTROL METHOD FOR SERVER

(71) Applicant: BROTHER KOGYO KABUSHIKI KAISHA, Nagoya (JP)

(72) Inventor: Hiromu Suzuki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/479,675

(22) Filed: Oct. 2, 2023

(65) Prior Publication Data

US 2024/0114099 A1 Apr. 4, 2024

(30) Foreign Application Priority Data

Oct. 3, 2022 (JP) .................................. 2022-159692
Aug. 16, 2023 (JP) .................................. 2023-132543

(51) Int. Cl.
*H04N 1/00* (2006.01)
*H04N 1/34* (2006.01)

(52) U.S. Cl.
CPC ..... *H04N 1/00925* (2013.01); *H04N 1/00411* (2013.01); *H04N 1/00962* (2013.01); *H04N 1/344* (2013.01)

(58) Field of Classification Search
CPC ........... H04N 1/00925; H04N 1/00411; H04N 1/00962; H04N 1/344; G06F 3/1229; G06F 3/1235

USPC ........................................................ 358/1.15
See application file for complete search history.

(56) References Cited

U.S. PATENT DOCUMENTS

| 10,536,606 B2 * | 1/2020 | Nagasaki ........... H04N 1/32101 |
| 11,726,727 B2 * | 8/2023 | Hayashi ............. H04N 1/00925 |
| | | 358/1.15 |
| 2017/0249641 A1 | 8/2017 | Ohara |
| 2020/0225885 A1 | 7/2020 | Akimoto |

FOREIGN PATENT DOCUMENTS

| JP | 2020-111023 A | 9/2017 |
| JP | 2017-156848 A | 7/2020 |

* cited by examiner

*Primary Examiner* — Kent Yip
(74) *Attorney, Agent, or Firm* — Merchant & Gould P.C.

(57) ABSTRACT

A server may include: a memory; and a controller, wherein the controller may be configured to: execute a registering process, wherein in the registering process, the controller may receive usage information from a terminal device and store the usage information in the memory, and the usage information may include a first attribute inputted to the terminal device by a user; and execute a starting process, wherein in the starting process, the controller may receive from the terminal device specific information and determine whether the first attribute matches a second attribute of a specific function executing device identified by the specific information and execute a service process for starting a provision of the service to the user using the usage information stored in the memory in a case where it is determined that the first attribute matches the second attribute.

13 Claims, 8 Drawing Sheets

SERVER, COMMUNICATION SYSTEM, NON-TRANSITORY COMPUTER-READABLE RECORDING MEDIUM STORING COMPUTER-READABLE INSTRUCTIONS FOR SERVER AND CONTROL METHOD FOR SERVER

REFERENCE TO RELATED APPLICATIONS

This application claims priority from Japanese Patent Application No. 2022-159692 filed on Oct. 3, 2022 and Japanese Patent Application No. 2023-132543 filed on Aug. 16, 2023. The entire contents of the priority applications are incorporated herein by reference.

BACKGROUND ART

An automatic toner delivery system is known. A user makes a contract with the automatic toner delivery system at the time of purchase of an MFP.

DESCRIPTION

A timing at which a user wishes to make a contract with an automatic toner delivery system is not limited to when the user purchases an MFP. For example, there may be a case where the MFP to be used by the user is not near the user at the timing when the user wishes to make a contract. The present disclosure provides a technique for proceeding with registration of usage information even when a specific function executing device is not near a user.

A server configured to provide a service for a function executing device is disclosed herein. The server may comprise: a memory; and a controller, wherein the controller may be configured to: communicate with a terminal device so as to execute a registering process for registering usage information for using the service, wherein in the registering process, the controller may be configured to receive the usage information from the terminal device and store the usage information received from the terminal device in the memory, and the usage information may include a first attribute inputted to the terminal device by a user; and after the registering process has been executed, communicate with the terminal device so as to execute a starting process for starting the service, wherein in the starting process, the controller may be configured to receive from the terminal device specific information for identifying a specific function executing device which is to be used in the service, the specific information may be outputted from the specific function executing device triggered by a predetermined operation on the specific function executing device, and in the starting process, the controller may be further configured to determine whether the first attribute matches a second attribute of the specific function executing device identified by the specific information received from the terminal device and execute a service process for starting a provision of the service to the user using the usage information stored in the memory in a case where it is determined that the first attribute matches the second attribute, wherein the service process may not be executed in a case where it is determined that the first attribute does not match the second attribute.

According to the above configuration, even when the specific function executing device is not near the user, it is possible to proceed with registration of the usage information as long as the attribute of the specific function executing device is known. Even if the user inputs a wrong attribute, it is determined that the wrong attribute does not match the actual attribute in the starting process after the registering process, and it is possible to suppress a provision of a wrong service corresponding to the wrong attribute to the user.

A computer-readable recording medium storing a computer program for realizing the above server is also novel and useful. Further, a control method for the above server is also novel and useful. Further, a communication system including the above server, the above terminal device, and the above specific function executing device is also novel and useful.

Figure 1:
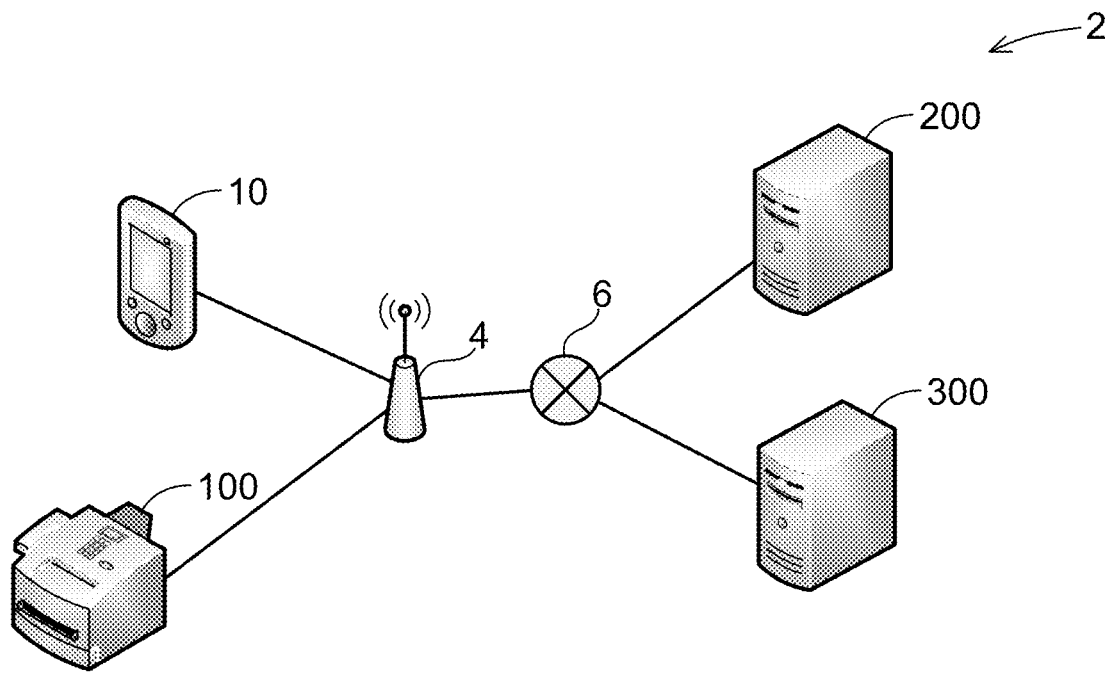
FIG. 1 illustrates an overview of a communication system.

Configuration of Communication System 2; FIG. 1

A communication system 2 includes an access point 4 (hereinafter referred to as "AP 4"), a mobile terminal 10, a printer 100, a management server 200, and a service providing server 300 (hereinafter referred to as "SP server 300"). The mobile terminal 10 is a mobile terminal device such as a smartphone, a tablet PC, or a laptop PC. In a modification, the communication system 2 may include a stationary terminal device (e.g., a desktop PC) instead of the mobile terminal 10. The printer 100 is a peripheral device configured to execute a printing function (e.g., a peripheral device of the mobile terminal 10). In a modification, the printer 100 may be a multifunctional device configured to execute a scanning function, facsimile function, and the like, in addition to the printing function. The mobile terminal 10 and the printer 100 are connected to the AP 4. In other words, the mobile terminal 10 and the printer 100 belong to a wireless Local Area Network (LAN) formed by the AP 4.

The AP 4 is connected to the Internet 6. The management server 200 and the SP server 300 are connected to the Internet 6. The mobile terminal 10 and the printer 100 are configured to communicate with the servers 200 and 300 on the Internet 6 via the AP 4. Instead of the AP 4, the mobile terminal 10 can communicate with the servers 200 and 300 on the Internet 6 via a base station (not shown) of a mobile communication system such as 4G, 5G, or the like.

Figure 2:
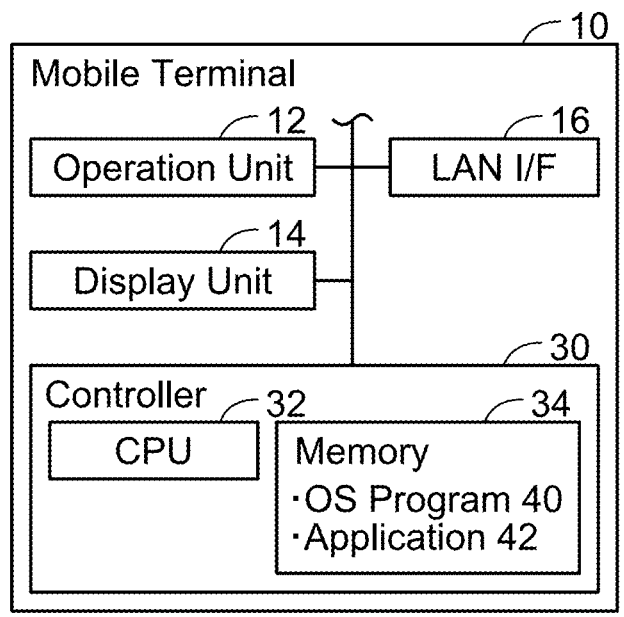
FIG. 2 illustrates a block diagram of a mobile terminal.

Configuration of Mobile Terminal 10; FIG. 2

The mobile terminal 10 includes an operation unit 12, a display unit 14, a LAN interface 16, and a controller 30. Each unit 12 to 30 is connected to a bus line (reference sign omitted). The interface is hereafter described as "I/F".

The operation unit 12 includes a plurality of keys. The user can input various instructions to the mobile terminal 10 by operating the operation unit 12. The display unit 14 is a display that displays various information. The display unit 14 also functions as a so-called touch screen (i.e., an operation unit that receives operation by a user). The LAN I/F 16 is an I/F for communication via a wireless LAN and is connected to the AP 4.

The controller 30 includes a CPU 32 and a memory 34. The CPU 32 executes various processes according to programs 40 and 42 stored in the memory 34. The memory 34 is configured of a volatile memory, nonvolatile memory, and the like. The OS program 40 is a program for controlling basic operation of the mobile terminal 10. The application program 42 (hereinafter referred to as "app 42") is a program for executing communication with the management server 200 and the SP server 300. The app 42 is provided, for example, by a vendor of the printer 100. The app 42 is downloaded to the mobile terminal 10, for example, from a server on the Internet 6 (not shown).

Figure 3:
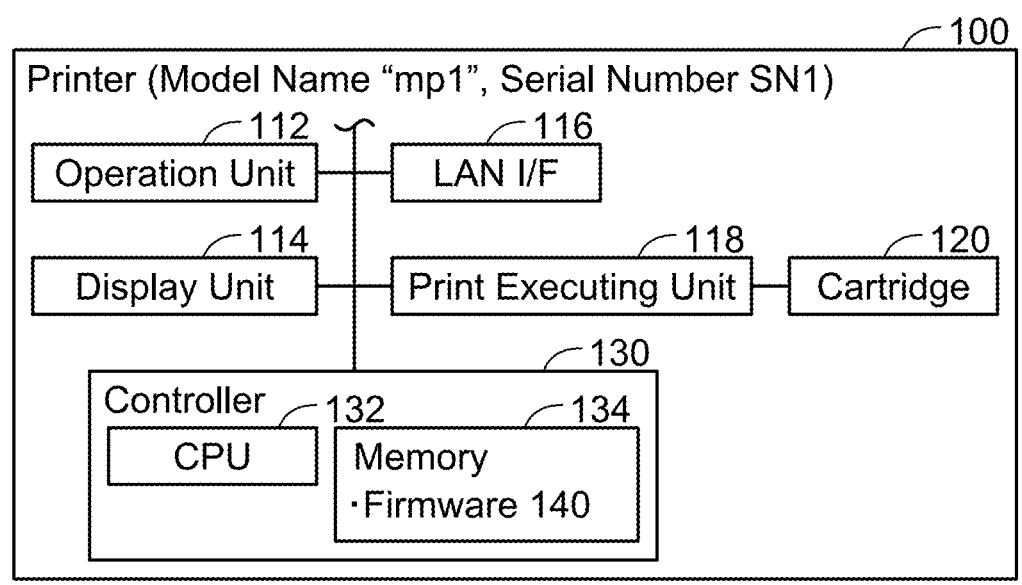
FIG. 3 illustrates a block diagram of a printer.

Configuration of Printer 100; FIG. 3

The printer 100 has a model name "mp1". A serial number SN1 is given to the printer 100. The serial number SN1 is a number that identifies the printer 100 and is given by the vendor, for example, when the printer 100 is manufactured.

The printer 100 includes an operation unit 112, a display unit 114, a LAN I/F 116, a print executing unit 118, and a controller 130. The operation unit 112, the display unit 114, and the LAN I/F 116 have the same functions as the operation unit 12, the display unit 14, and the LAN I/F 16, respectively.

The controller 130 includes a CPU 132 and a memory 134. The CPU 132 executes various processes according to a firmware 140 stored in the memory 134. The firmware 140 is a program for controlling basic operation of the printer 100. The firmware 140 can be updated as needed.

The print executing unit 118 includes a printing mechanism of an inkjet scheme. A cartridge 120 containing ink is removably attached to the print executing unit 118. The print executing unit 118 executes printing using the ink in the cartridge 120. In a modification, the print executing unit 118 may include a printing mechanism of a laser scheme.

Figure 4:
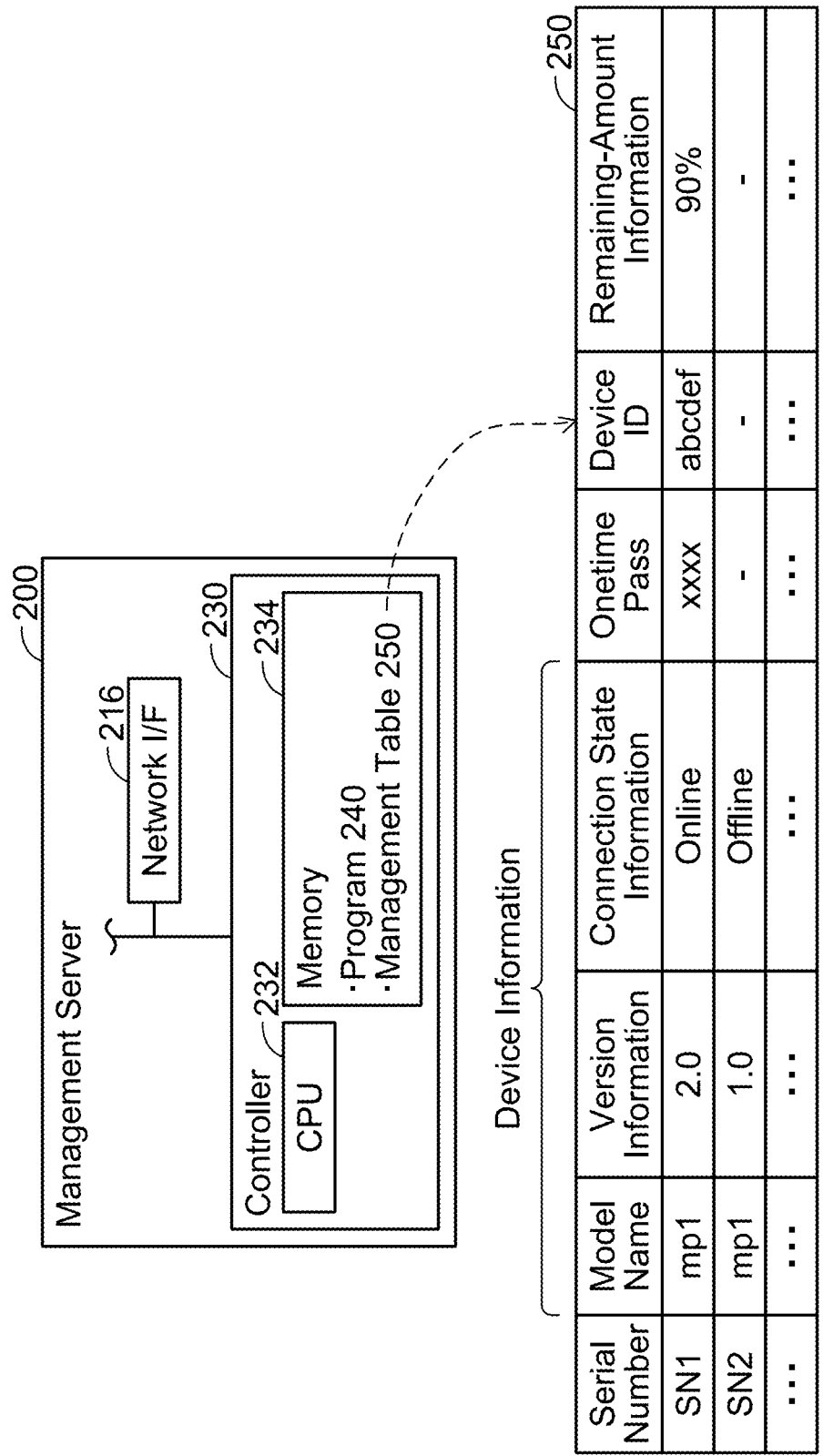
FIG. 4 illustrates a block diagram of a management server.

Configuration of Management Server 200; FIG. 4

The management server 200 is a server for managing states of a plurality of printers, including the printer 100. The management server 200 is installed on the Internet 6 by the vendor of the printer 100. In a modification, the management server 200 may be installed on the Internet 6 by a different provider than the vendor of the printer 100.

The management server 200 includes a network I/F 216 and a controller 230. The network I/F 216 is an I/F for executing communication via the Internet 6 and is connected to the Internet 6. The controller 230 includes a CPU 232 and a memory 234. The CPU 232 executes various processes according to a program 240 stored in the memory 234.

The memory 234 further stores a management table 250. The management table 250 stores, for each of the plurality of printers, various information about the printer. The information includes a serial number, device information, a onetime pass, a device ID, a remaining amount information, and the like. The device information indicates current settings of the printer installed at a given location (e.g., office). The device information includes a model name of the printer, version information indicating a current version of the firmware of the printer, and connection state information indicating a connection state of the printer to the Internet 6, and the like. The onetime pass will be described later. The device ID is information that identifies the printer and is given by the SP server 300. The remaining amount information indicates a current remaining amount of ink contained in a cartridge (e.g., 120) connected to the printer. Although not illustrated, the management table 250 also stores the total number of printed sheets printed by the printer.

For example, when the printer 100 is installed at a predetermined place and the printer 100 is connected to the Internet 6, the management table 250 receives from the printer 100 the serial number SN1, the model name "mp1" of the printer 100, and the version information of the firmware 140 (for example, "2.0"). Since the communication with the printer 100 via the Internet 6 has been executed, the management server 200 stores the connection state information "online" in the management table 250 as the device information. If communication with the printer 100 via the Internet 6 cannot be executed, the management server 200 stores connection state information "offline" in the management table 250 instead of the connection state information "online". When the firmware 140 is updated, the management server 200 receives new version information from the printer 100 and stores it in the management table 250.

The onetime pass, the device ID, and remaining amount information are stored in the management table 250 by execution of processes in FIG. 6 to FIG. 9 described below.

Figure 5:
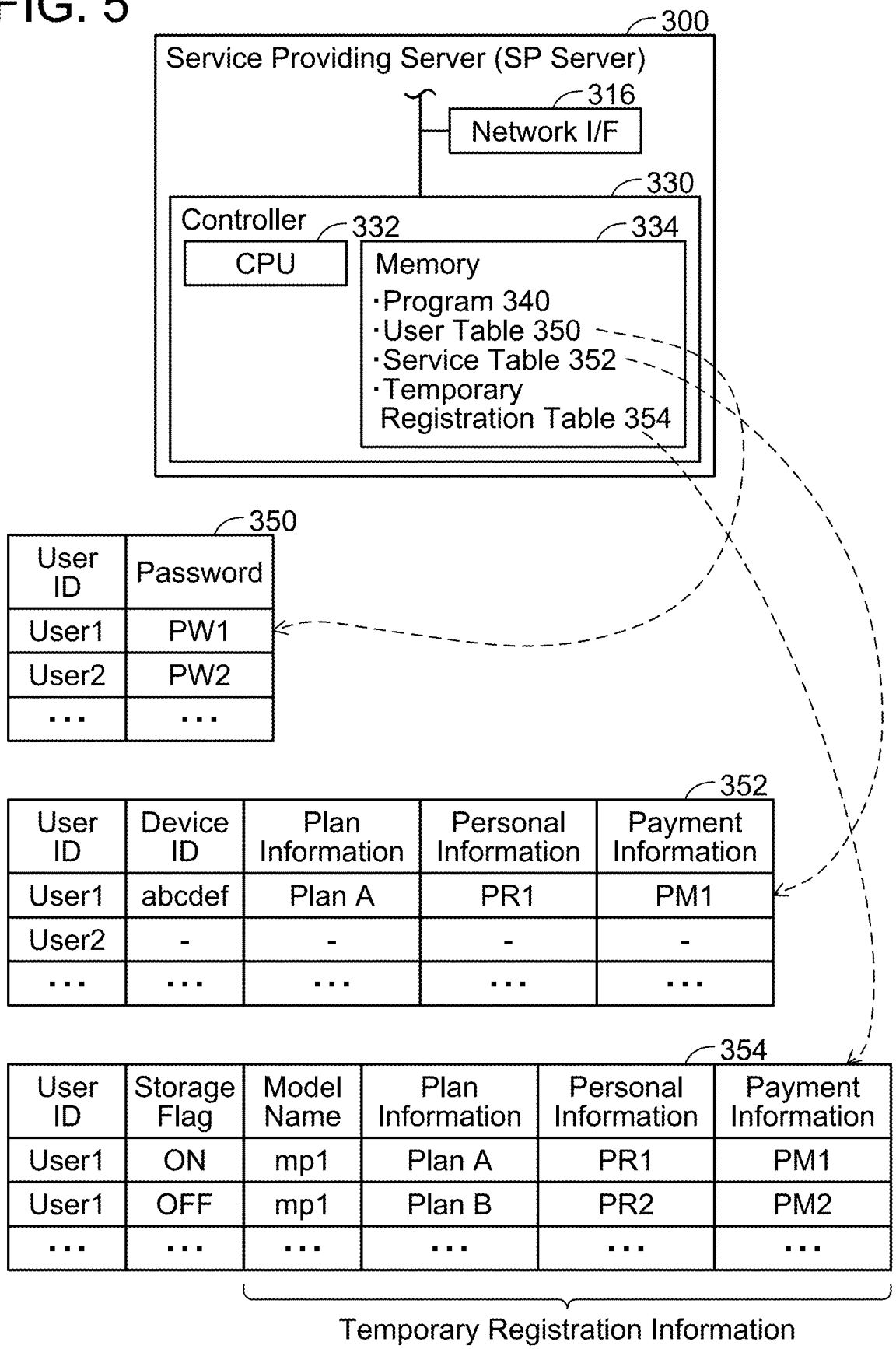
FIG. 5 illustrates a block diagram of a service providing server.

Configuration of SP Server 300; FIG. 5

The SP server 300 provides a flat-rate printing service for a printer (hereinafter described as "flat-rate service"). The flat-rate service is a service that charges a predetermined fee when the number of sheets printed in a predetermined period (e.g., one month) is the contractual number of print sheets (e.g., 1,000 sheets) or smaller. The flat-rate service includes a service to automatically ship a new cartridge when a remaining amount of ink in a cartridge (e.g., 120) attached to a print executing unit of the printer falls to or below a predetermined remaining amount. In a modification, the SP server 300 may provide a pay-as-you-print service that charges a fee based on the number of sheets printed in a predetermined period (e.g., one month). In another modification, the SP server 300 may provide a service that automatically ships a new cartridge and charges a fee each time the cartridge is shipped.

The SP server 300 includes a network I/F 316 and a controller 330. The network I/F 316 is connected to the Internet 6. The controller 330 includes a CPU 332 and a memory 334. The CPU 332 executes various processes according to a program 340 stored in the memory 334.

The memory 334 further stores a user table 350, a service table 352, and a temporary registration table 354. The user table 350 stores, for each of a plurality of users, a user ID (e.g., "user1") identifying the user and a password (e.g., PW1). The service table 352 stores, for each of the plurality of users, the user ID (e.g., "user1"), a device ID (e.g., "abcdef"), plan information (e.g., "Plan A"), personal information (e.g., PR1), and payment information (e.g., PM1). The plan information indicates a service plan selected by the user. The service plan is set according to, for example, the contractual number of print sheets and/or a printer model, and there is a plurality of types of service plans. For example, a first plan of the plurality of types of plans matches the printer 100 having a model name "mp1", while a second plan of the plurality of types of plans matches a printer having a model name different from the model name "mp1". The personal information indicates the user's name, the user's address, an email address the user can use, and the like. The payment information is information about a source of payment of a fee (e.g., credit card number). The SP server 300 uses the information in the service table 352 to provide the flat-rate service to the user.

The temporary registration table 354 is a table for temporarily storing information to be stored in the service table 352. The temporary registration table 354 stores a storage flag and temporary registration information in association with the user ID. The storage flag indicates a value of either "ON" indicating that the temporary registration information has been stored in the service table 352 or "OFF" indicating that the temporary registration information has not yet been stored in the service table 352. The temporary registration information includes the model name, the plan information, the personal information, and the payment information. As shown in FIG. 5, one user, for example, the user identified by the user ID "user1", can store a plurality of pieces of temporary registration information in the temporary registration table 354. The user identified by the user ID "user1" is hereinafter described as a user "user1".

Process to Start Using Flat-Rate Service; FIG. 6 to FIG. 9

Figure 6:
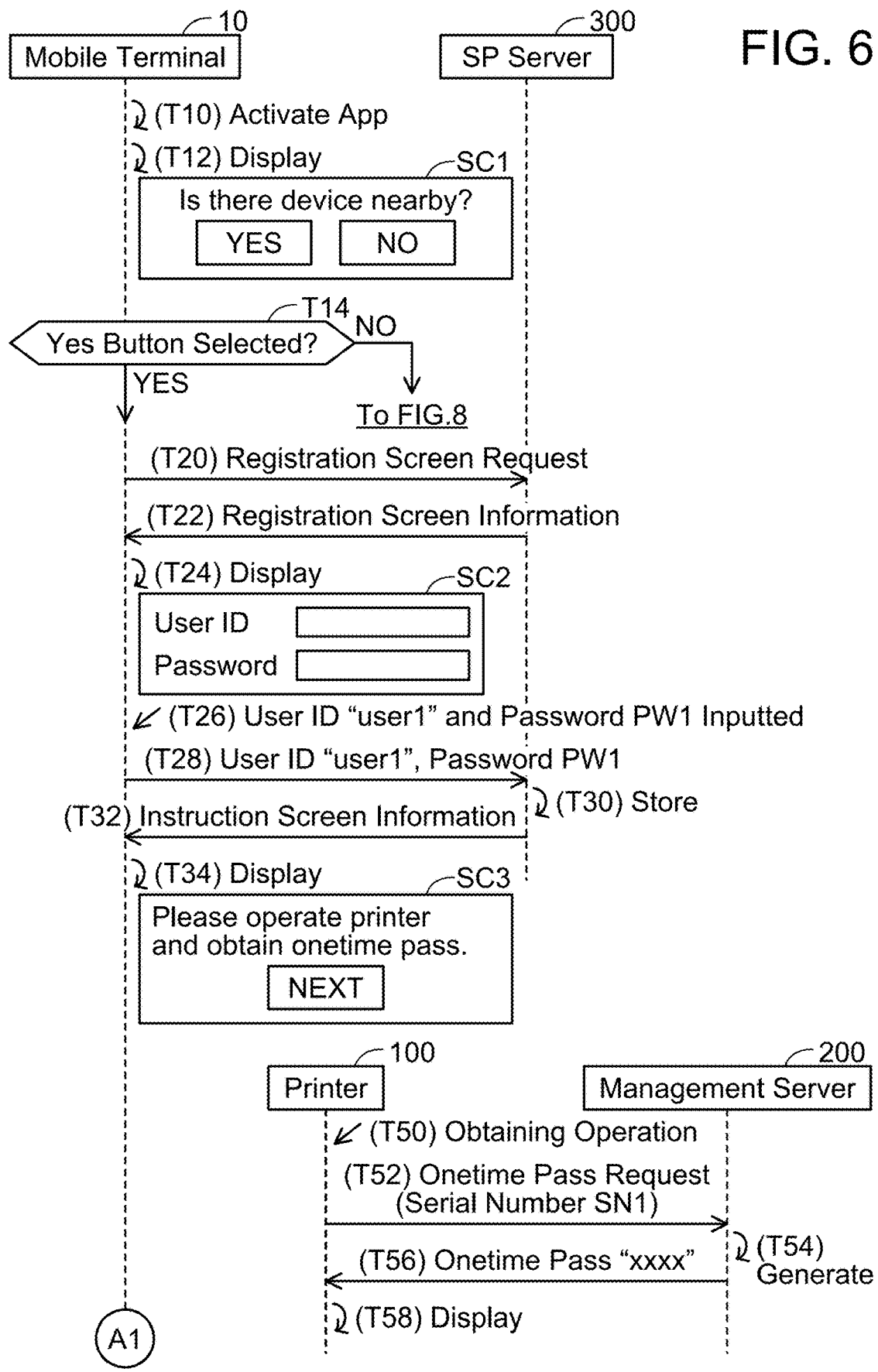
FIG. 6 illustrates a sequence diagram of a process to start using a service.
Figure 7:
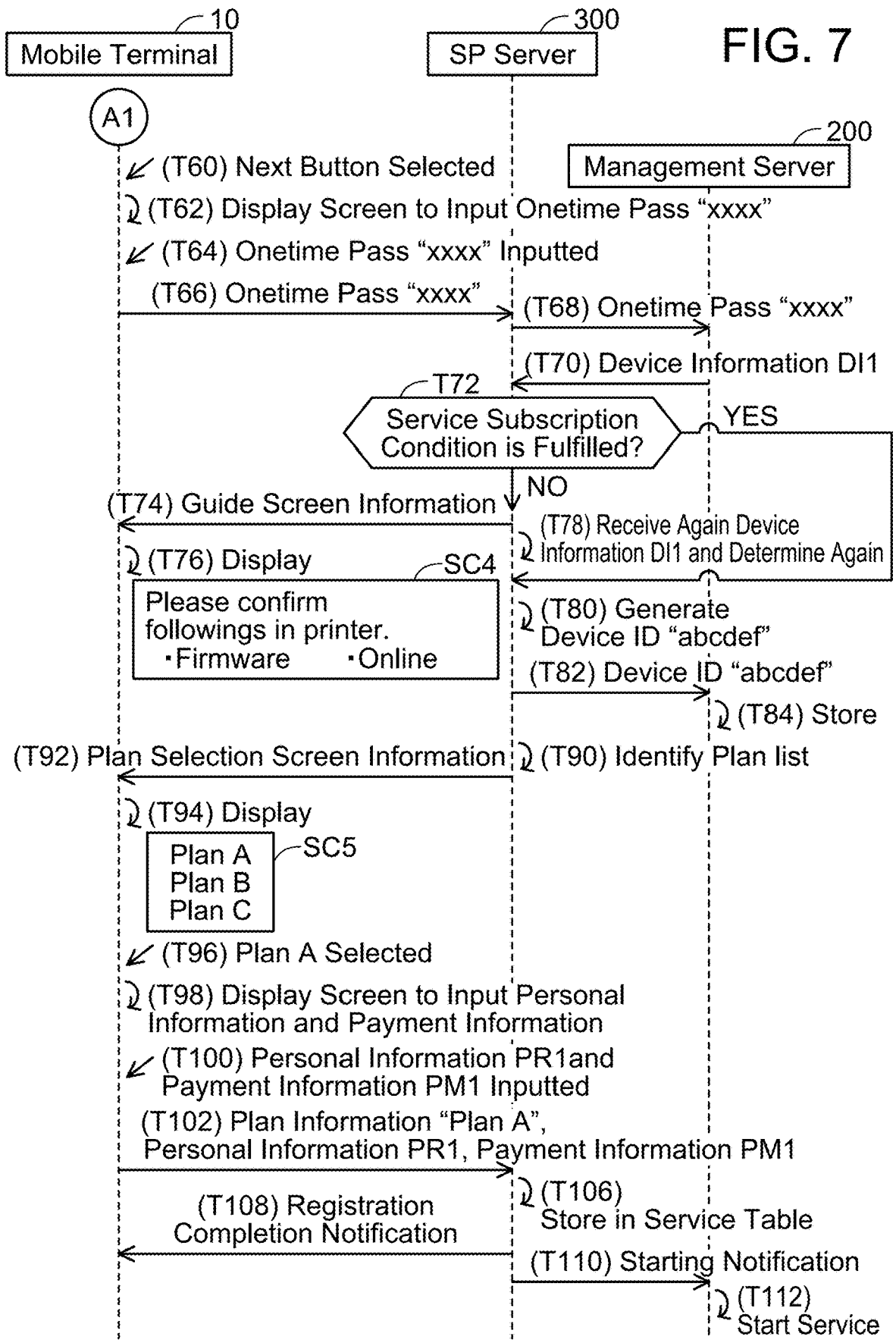
FIG. 7 illustrates a continuation of FIG. 6 when a YES button is selected.
Figure 8:
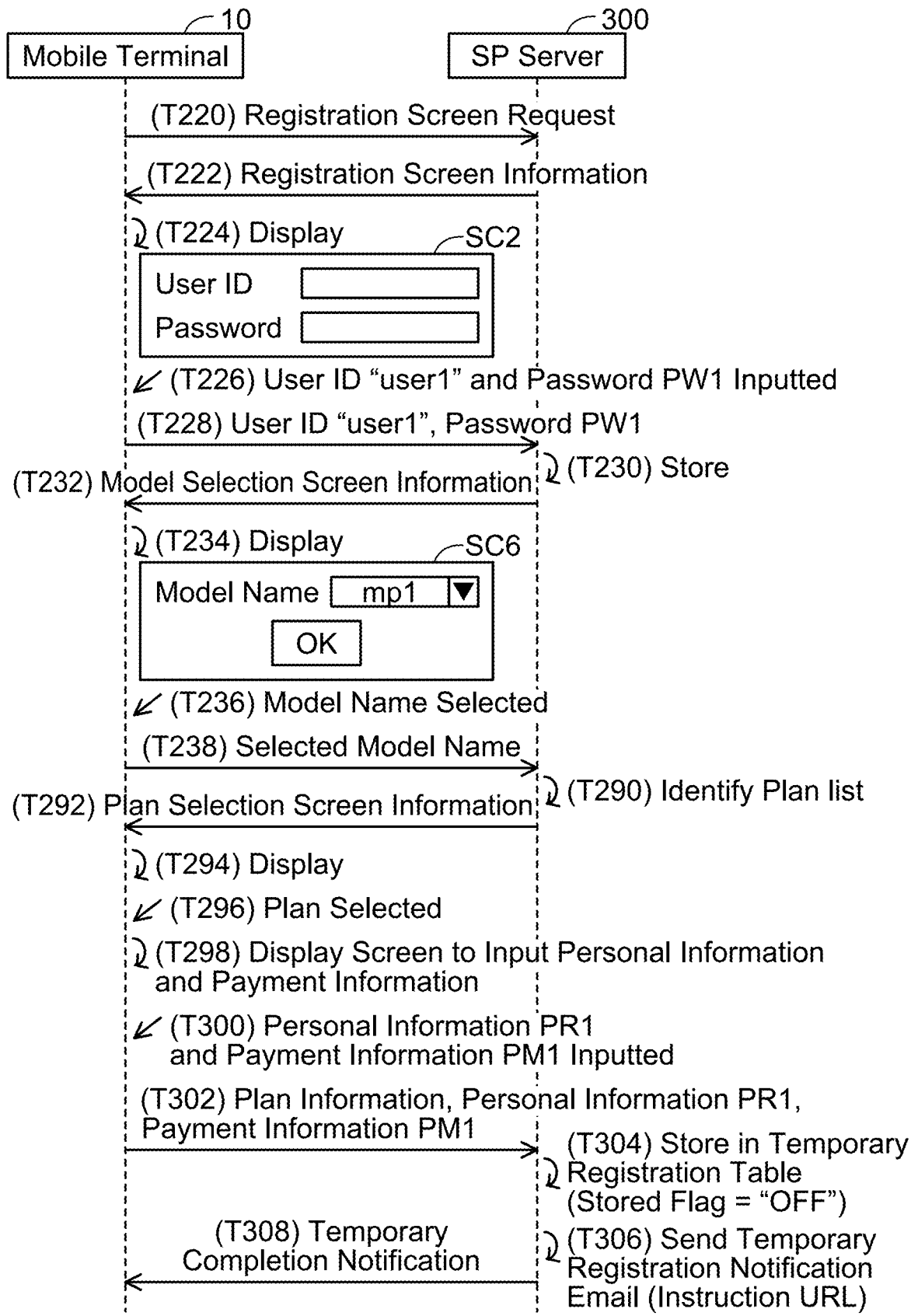
FIG. 8 illustrates a continuation of FIG. 6 when a NO button is selected.

Referring to FIGS. 6 to 9, a process to start using the flat-rate service is described. Since all of the following communication is executed via any one(s) of the LAN I/F 16, the LAN I/F 116, the network I/F 216, and the network I/F 316, explanations "via the LAN I/F 16 (or 116)" and "via the network I/F 216 (or 316)" are omitted hereafter. In FIGS. 6 to 8, for easier understanding, the operations executed by the CPU 32 of the mobile terminal 10, the CPU 132 of the printer 100, the CPU 232 of the management server 200, and the CPU 332 of the SP server 300 are described not with the respective CPUs (e.g., 32) as subjects of the operations, but with the respective devices (e.g., mobile terminal 10) as subjects of the operations.

In the initial state shown in FIG. 6, the printer 100 is installed at a predetermined location and is connected to the Internet 6 via the AP 4. The serial number SN1 and the device information DI1 of the printer 100 are stored in the management table 250. On the other hand, neither the user ID that identifies the user of the printer 100 nor the password is stored in the user table 350. In addition, information about the user of the printer 100 is not stored in the service table 325 nor in the temporary registration table 354.

In T10, the mobile terminal 10 activates the app 42 according to instructions inputted to the operation unit 12. Among processes from T12 to be described later, processes executed by the mobile terminal 10 are executed according to the app 42.

In T12, the mobile terminal 10 displays an inquiry screen SC1 on the display unit 14. The inquiry screen SC1 includes a YES button indicating a reply that the printer 100 is near the user and a NO button indicating a reply that the printer 100 is not near the user. For example, when the user is at a different location than the predetermined location (e.g., away from an office or home), the printer 100 is not near the user. For example, even when the user is at the predetermined location, the printer 100 is not near the user when a distance between the user and the printer 100 is relatively large.

In T14, the mobile terminal 10 determines whether the YES button in the inquiry screen SC1 is selected. When the mobile terminal 10 determines that the NO button in the inquiry screen SC1 is selected due to the printer 100 not being near the user (NO in T14), the mobile terminal 10 proceeds to a process of FIG. 8 to be described later. On the other hand, when the mobile terminal 10 determines that the YES button in the inquiry screen SC1 is selected due to the printer 100 being near the user (YES in T14), the mobile terminal 10 proceeds to processes from T20.

Case in which YES Button in Inquiry Screen SC1 Is Selected; FIG. 6, FIG. 7

In T20, the mobile terminal 10 sends to the SP server 300 a registration screen request requesting registration screen information corresponding to a registration screen SC2. The registration screen SC2 is a screen displayed first among a plurality of processes for registering various information required to use the flat-rate service (e.g., information to be stored in the service table 352). The registration screen SC2 includes input fields for inputting a user ID and a password.

In T22, the mobile terminal 10 receives the registration screen information from the SP server 300 as a response to the registration screen request of T20. In T24, the mobile terminal 10 displays the registration screen SC2 corresponding to the registration screen information received from the SP server 300 on the display unit 14.

In the present case, the user of the printer 100 sets a new user ID and a password. In T26, the user inputs the user ID "user1" and the password PW1 as the new user ID and password in the input fields of the registration screen SC2.

When the mobile terminal 10 receives input of the user ID "user1" and the password PW1 in T26, the mobile terminal 10 sends the user ID "user1" and the password PW1 to the SP server 300 in T28. Consequently, the SP server 300 stores the user ID "user1" and the password PW1 received from the mobile terminal 10 in the user table 350 in T30. The SP server 300 then establishes a login session with the mobile terminal 10 using the user ID "user1" and the password PW1. If the user ID "user1" and the password PW1 are stored in the user table 350 in advance, the SP server 300 skips the process of T30 and establishes the login session with the mobile terminal 10.

In the subsequent T32, the SP server 300 sends instruction screen information corresponding to an instruction screen SC3 to the mobile terminal 10. The instruction screen SC3 includes a message indicating an instruction to cause the printer 100 to obtain a onetime pass, and a NEXT button.

When the mobile terminal 10 receives the instruction screen information from the SP server 300 in T32, the mobile terminal 10 displays the instruction screen SC3 on the display unit 14 in T34.

The user views the instruction screen SC3 displayed on the mobile terminal 10, and in T50, the user performs an obtaining operation on the operation unit 112 of the printer 100 to cause the printer 100 to obtain the onetime pass. The printer 100 sends a onetime pass request to the management server 200 in T52. The onetime pass request is a command requesting sending of the onetime pass according to the obtaining operation of T50, and includes the serial number SN1 of the printer 100.

When the management server 200 receives the onetime pass request from the printer 100 in T52, the management server 200 generates a onetime pass "xxxx" in T54 and stores the onetime pass "xxxx" in the management table 250 in association with the serial number SN1 included in the onetime pass request. Further, the management server 200 sends the onetime pass "xxxx" to the printer 100 in T56.

When the printer 100 receives the onetime pass "xxxx" from the management server 200 in T56, the printer 100 displays the onetime pass "xxxx" on the display unit 114 in T58. The user can see the onetime pass "xxxx" displayed on the display unit 114 and know the onetime pass "xxxx".

In T60 in FIG. 7, the user selects the NEXT button in the instruction screen SC3 (see FIG. 6). When the mobile terminal 10 receives selection of the NEXT button in T60, the mobile terminal 10 displays a onetime pass input screen (not shown) on the display unit 14 in T62. In T64, the mobile terminal 10 receives input of the onetime pass "xxxx" from the user on the input screen. In T66, the mobile terminal 10 sends to the SP server 300 the onetime pass "xxxx" inputted to the input screen.

When the SP server 300 receives the onetime pass "xxxx" from the mobile terminal 10 in T66, the SP server 300 sends the onetime pass "xxxx" to the management server 200 in T68.

When the management server 200 receives the onetime pass "xxxx" from the SP server 300 in T68, the management server 200 obtains device information DI1 stored in association with the onetime pass "xxxx" from the management table 250. The device information DI1 includes the model name "mp1", the version information "2.0", and the connection state information "online" of the printer 100 (see FIG. 4). That is, the model name of the printer 100 and the current state of the printer 100 are identified by the onetime pass "xxxx". In T70, the management server 200 sends the device information DI1 to the SP server 300.

When the SP server 300 receives the device information DI1 from the management server 200 in T70, the SP server 300 determines in T72 whether the device information DI1 fulfills service subscription conditions. The service subscription conditions are a plurality of conditions, including a first condition that the model name of the printer 100 indicates a model which can use the flat-rate service, a second condition that the current version of the firmware 140 of the printer 100 is a predetermined version or higher, and a third condition that the printer 100 is configured to execute communication via the Internet 6. In the present case, the model name "mp1" is a model which can use the flat-rate service, and the predetermined version is "2.0". The above "2.0" is only an example. Further, as described above, the device information DI1 includes the connection state information "online". In the present case, the SP server 300 determines that the service subscription conditions, which are a plurality of conditions including the first to third conditions, are fulfilled (YES in T72) and the SP server 300 proceeds to the process of T80.

If it is determined that the service subscription conditions are not fulfilled (NO in T72), in T74, the SP server 300 sends guide screen information corresponding to a guide screen SC4 to the mobile terminal 10. As a result, the mobile terminal 10 displays the guide screen SC4 on the display unit 14 in T76. The guide screen SC4 is a screen that guides the user to check the state of the printer 100. The guide screen SC4 includes a message guiding the user to perform an operation to update the firmware of the printer 100 and a message guiding the user to perform an operation to connect the printer 100 to the Internet 6. The user views the guide screen SC4 to operate the printer 100. For example, the user performs an operation to update the firmware 140 of the printer 100. It is possible to suppress a failure to start using the flat-rate service due to the current state of the printer 100 not fulfilling the service subscription conditions.

In T74, the SP server 300 sends the guide screen information to the mobile terminal 10, and in T78, the SP server 300 again receives the device information DI1 and makes the determination of T72. The SP server 300 repeatedly receives the device information DI1 and makes the determination of T72 until the device information DI1 fulfills the service subscription conditions. For example, when the firmware 140 of the printer 100 is updated by the operation by the user, the newly received device information DI1 fulfills the service subscription conditions, and the SP server 300 proceeds to processes from T80. Consequently, it is possible to suppress the failure to start using the flat-rate service due to the current state of the printer 100 not fulfilling the service subscription conditions. When a timeout occurs without the device information DI1 fulfilling the service subscription conditions, the SP server 300 notifies the mobile terminal 10 of the error and terminates the process to start using the flat-rate service.

In T80, the SP server 300 generates the device ID "abcdef". The SP server 300 stores the device ID "abcdef" in the service table 352 in association with the logged-in user ID "user1".

In T82, the SP server 300 sends the device ID "abcdef" to the management server 200. Consequently, in T84, the management server 200 stores the device ID "abcdef" in the management table 250 in association with the onetime pass "xxxx" received from the SP server 300 in T68.

In T90, the SP server 300 identifies a list of plans matching the printer 100 having the model name "mp1" included in the device information DI1 received in T70 among a plurality of types of plans. If there is only one plan matching the printer 100 having the model name "mp1", the list of plans may include only one plan. That is, the list of plans includes one or more plans.

In T92, the SP server 300 sends plan selection screen information corresponding to a plan selection screen SC5 to the mobile terminal 10. The plan selection screen information includes the list of plans identified in T90.

When the mobile terminal 10 receives the plan selection screen information from the SP server 300 in T92, the mobile terminal 10 displays the plan selection screen SC5 on the display unit 14 in T94. The plan selection screen SC5 displays the list of plans included in the plan selection screen information. In the present case, the mobile terminal 10 receives selection of "Plan A" in the plan selection screen SC5 in T96.

In T98, the mobile terminal 10 displays an input screen (not shown) for inputting the personal information and the payment information on the display unit 14. In T100, the mobile terminal 10 receives input of personal information PR1 and payment information PM1 on this input screen.

In T102, the mobile terminal 10 sends to the SP server 300 the plan information "Plan A" selected in T96 and the personal information PR1 and the payment information PM1 inputted in T100.

When the SP server 300 receives each information from the mobile terminal 10 in T102, the SP server 300 stores in the service table 352 each information received from the mobile terminal 10, namely, the plan information "Plan A", the personal information PR1, and the payment information PM1, in association with the logged-in user ID "user1" in T106. Consequently, registration of the information for the user "user1" to use the flat-rate service is completed.

In T108, the SP server 300 sends to the mobile terminal 10 a registration completion notification indicating that the registration of the information to start using the flat-rate service is completed. Further, in T110, the SP server 300 sends to the management server 200 a start notification instructing the start of use of the flat-rate service. Consequently, in T112, the management server 200 executes communication with the printer 100 to start using the flat-rate service. This communication includes, for example, sending to the printer 100 an instruction to change a mode of the printer 100 to a mode that permits use of the flat-rate service. Once the mode of the printer 100 is changed, a constant connection, such as an Extensible Messaging and Presence Protocol (XMPP) connection, is established between the printer 100 and the management server 200. The management server 200 uses the XMPP connection to send a subscribe request to the printer 100 and periodically receives the remaining amount information from the printer 100. For example, when the remaining amount information received from the printer 100 indicates a remaining amount that is a predetermined value or smaller, the management server 200 sends to the SP server 300 an instruction to ship the cartridge 120. This instruction includes the device ID "abcdef". The SP server 300 executes a process to ship the cartridge 120 to the user (e.g., notifying a worker) by using the information stored in the service table 352 in association with the device ID "abcdef" in this instruction. Consequently, the service of the flat-rate service to ship the cartridge 120 is provided.

Figure 9:
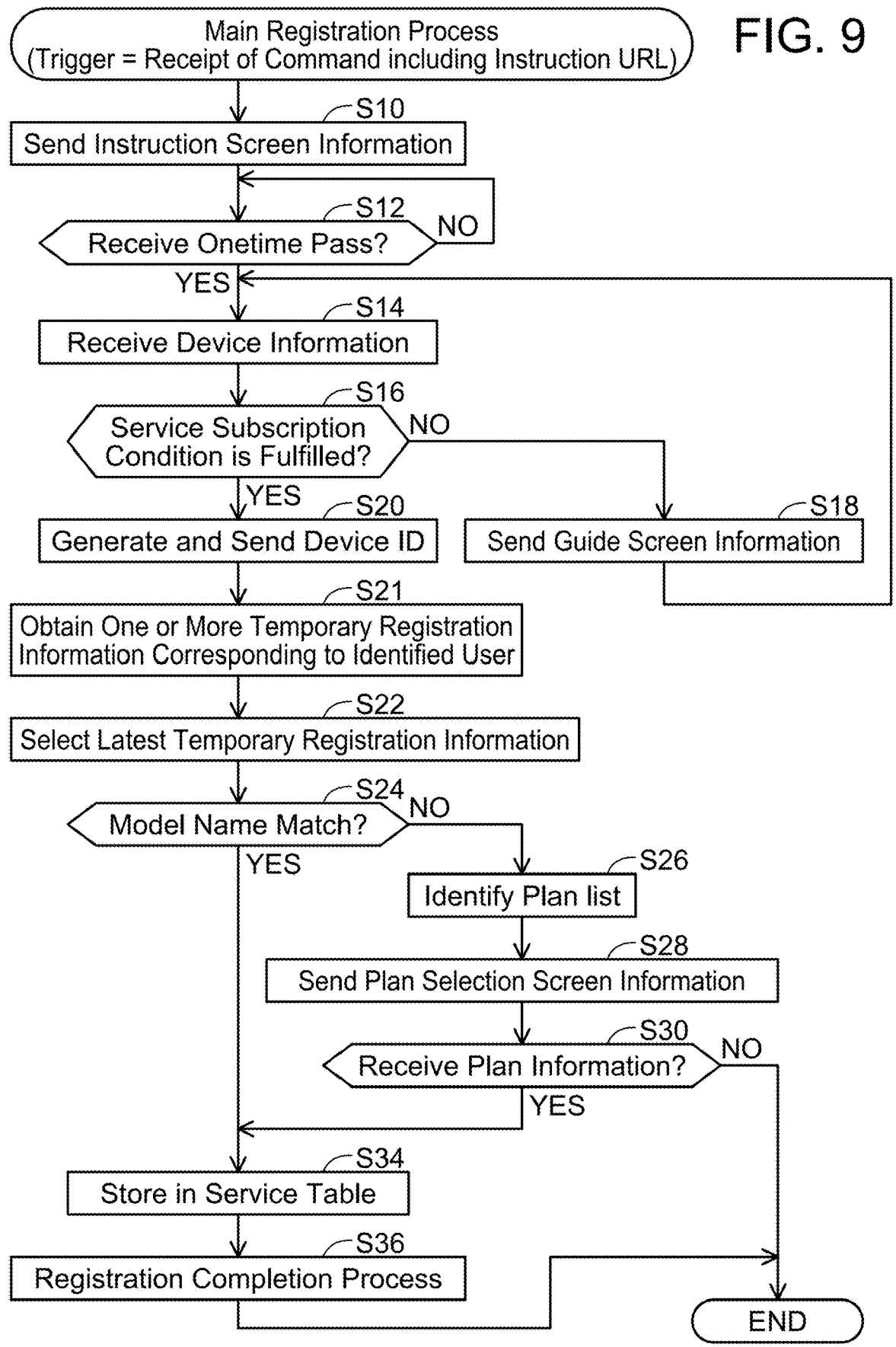
FIG. 9 illustrates a flowchart of a main registration process.

Case in which NO Button in Inquiry Screen SC1 Is Selected; FIGS. 8 and 9

In the present case, the printer 100 is not near the user. The mobile terminal 10 proceeds to T220 when the NO button is selected on the inquiry screen SC1 of FIG. 6 (NO in T14). T220 to T230 are the same as T20 to T30 of FIG. 6.

When the SP server 300 stores the user ID "user1" and the password PW1 received from the mobile terminal 10 in the user table 350 in T230, the SP server 300 sends model selection screen information corresponding to a model selection screen SC6 to the mobile terminal 10 in T232. The model selection screen SC6 includes a selection field for selecting the model of the printer which the user is using from among a plurality of types of models. In a modification, the model selection screen SC6 may include an input field for inputting a model name instead of the selection field.

When the mobile terminal 10 receives the model selection screen information from the SP server 300 in T232, the mobile terminal 10 displays the model selection screen SC6 on the display unit 14 in T234. In the present case, the user uses the printer 100 having the model name "mp1". For example, in T236, the user selects the model name "mp1" on the model selection screen SC6. Further, for example, in T236, the user may mistakenly select a model name different from the model name "mp1" on the model selection screen SC6.

In T236, the mobile terminal 10 receives the selection of the model name on the model selection screen SC6, and sends the model name selected in T236 (hereinafter referred to as "selected model name") to the SP server 300 in T238.

When the SP server 300 receives the selected model name from the mobile terminal 10 in T238, the SP server 300 identifies the list of plans matching the printer having the selected model name from among the plurality of types of plans in T290.

T292 to T302 are the same as T92 to T102 in FIG. 6. When the selected model name is the model name "mp1", the plan information of T296 and T302 is the plan matching the printer 100. On the other hand, when the selected model name is different from the model name "mp1", the plan information of T296 and T302 may be a plan that does not match the printer 100.

When the SP server 300 receives, in T302, from the mobile terminal 10 the plan information selected in T296 and the personal information PR1 and the payment information PM1 inputted in T300, the SP server 300 stores the information received in T302 and the storage flag "OFF" in the temporary registration table 354 in association with the logged-in user ID "user1" in T304.

In T306, the SP server 300 sends a temporary registration notification e-mail with an e-mail address included in the personal information PR1 received in T302 as a recipient. The temporary registration notification e-mail includes an instruction Uniform Resource Locator (URL) for instructing the start of execution of a main registration process in FIG. 9 to be described later. The instruction URL is generated by the SP server 300 and includes information for identifying the logged-in user ID "user1". For example, the e-mail address included in the personal information PR1 is set in a mailer of the mobile terminal 10, and the temporary registration notification e-mail is displayed on the mobile terminal 10.

In T308, the SP server 300 sends to the mobile terminal 10 a temporary registration completion notification indicating that the temporary registration of the information to start using the flat-rate service is completed. At this stage, information (e.g., plan information, etc.) regarding the user "user1" is not stored in the service table 352. At this stage, the user "user1" cannot use the flat-rate service.

The user "user1" can repeatedly perform the process of FIG. 8. For example, when user "user1" sees the temporary registration completion notification and notices that the model name is incorrect, the user again performs the process of FIG. 8. Further, for example, when the user "user1" sees the temporary registration completion notification and wishes to select different plan information than the selected plan information, the user again perform the process of FIG. 8. By repetitive execution of the process of FIG. 8, as shown in FIG. 5, a plurality of pieces of temporary registration information are stored in the temporary registration table 354 for the user ID "user1".

Main Registration Process; FIG. 9

Referring to FIG. 9, a main registration process which the CPU 332 of the SP server 300 executes in accordance with the program 340 is described. The start of this process is triggered by, in response to the instruction URL in the temporary registration notification e-mail of T306 being selected, receiving a command including the instruction URL from the terminal device (e.g., the mobile terminal 10) that received this e-mail.

In S10, the CPU 332 sends the instruction screen information to the mobile terminal 10 as in T32 in FIG. 6. Consequently, as in T50 in FIG. 6, the obtaining operation is executed on the printer 100, and the onetime pass "xxxx" is displayed on the printer 100.

In S12, the CPU 332 monitors the receipt of the onetime pass "xxxx" from the mobile terminal 10. The CPU 332 proceeds to S14 when the onetime pass "xxxx" is received from the mobile terminal 10 (YES in S12).

In S14, as in T68 and T70 in FIG. 7, the CPU 332 sends the onetime pass "xxxx" received in S12 to the management server 200 and receives the device information DI1 stored in association with the onetime pass from the management server 200.

In S16, as in T72 in FIG. 7, the CPU 332 determines whether the device information DI1 received in S14 fulfills the service subscription conditions. When the CPU 332 determines that the device information DI1 does not fulfill the service subscription conditions (NO in S16), the CPU 332 proceeds to S18.

In S18, as in T74 in FIG. 7, the CPU 332 sends the guide screen information to the mobile terminal 10. Consequently, the guide screen SC4 is displayed on the mobile terminal 10, and operations to update the firmware and the like are executed on the printer 100. When S18 ends, the CPU 332 returns to the process of S14, and again receives the device information as in T78 in FIG. 7. According to such a configuration, in the main registration process as well, it is possible to suppress the failure to start using the flat-rate service due to the fact that the current state of the printer 100 does not fulfill the service subscription conditions, in particular, the firmware has not been updated.

When the CPU 332 determines that the device information DI1 received in S14 fulfills the service subscription conditions (YES in S16), the CPU 332 proceeds to S20.

S20 is the same as T80 to T82 in FIG. 7. In the subsequent S21, the CPU 332 obtains from the temporary registration table 354 one or more pieces of temporary registration information stored in association with the user ID "user1" identified by the instruction URL.

In S22, the CPU 332 selects the latest temporary registration information which is last stored in the temporary registration table 354 among the one or more pieces of temporary registration information obtained in S21. This is because it is presumed that, among the one or more pieces of temporary registration information, the latest temporary registration information reflects the user's intention the most.

In S24, the CPU 332 determines whether the model name "mp1" included in the device information DI1 received in S14 matches the model name included in the temporary registration information selected in S22. When the CPU 332 determines that the model name "mp1" included in the device information DI1 matches the model name included in the temporary registration information (YES in S24), the CPU 332 proceeds to S34.

In S34, the CPU 332 stores the latest temporary registration information selected in S22 in the service table 352 in association with the user ID "user1" identified by the instruction URL. In S36, the CPU 332 executes the registration completion process including the same processes as T110 and T108 in FIG. 7. Consequently, as in T112 in FIG. 7, the flat-rate service is started. When YES is determined in S24, the flat-rate service using the latest temporary registration information is started. When S36 ends, the CPU 332 ends the process of FIG. 9.

When the CPU 332 determines that the model name "mp1" included in the device information DI1 does not match the model name included in the temporary registration information (NO in S24), the CPU 332 proceeds to S26. S26 is the same as T90 in FIG. 7. S28 is the same as T92. The fact that the model name "mp1" included in the device information DI1 does not match the model name included in the temporary registration information means that a model name different from the model name "mp1" was selected by mistake in T236 in FIG. 8. The plan selection screen information sent in S28 includes a list of plans that match the model name "mp1", and this list of plans may differ from the list of plans identified in T290 in FIG. 8.

The plan selection screen information is sent to the mobile terminal 10 in S28, by which the mobile terminal 10 displays the plan selection screen SC5 displaying the list of plans that match the model name "mp1". In S30, the CPU 332 monitors receipt of the plan information indicating a plan selected on the plan selection screen SC5 from the mobile terminal 10. When the CPU 332 receives the plan information from the mobile terminal 10 (YES in S30), the CPU 332 proceeds to S34. In S34 after YES is determined in S30, the CPU 332 stores information except the plan information among the latest temporary registration information (e.g., the personal information PR1 and the payment information PM1) in the service table 352, and stores the plan information received in S30 in the service table 352 instead of the plan information in the latest temporary registration information. Consequently, the flat-rate service using the plan information received in S30 is started.

Effect of Present Embodiment

According to the configuration of the present embodiment, even when the printer 100 is not near the user, the user can proceed with the registration of the temporary registration information including the plan information, the personal information PR1, and the payment information PM1 as long as the user knows the model name "mp1" of the printer 100 (FIG. 8). In particular, the temporary registration information is information that can be inputted even when the printer 100 is not near the user. Therefore, the process for using the flat-rate service can be proceeded in advance in the situation where the printer 100 is not near the user, for example, when the user is away from an office or home. User convenience is improved. Even if the user inputs a wrong model name, it is determined in the main registration process that the wrong model name does not match the model name "mp1" of the printer 100 which the user is actually using (NO in S24 in FIG. 9), and the provision of a wrong flat-rate service corresponding to the wrong model name to the user can be suppressed.

In the present embodiment, when it is determined that the wrong model name does not match the actual model name "mp1" (NO in S24 of FIG. 9), the plan selection screen information including the list of plans that match the actual model name "mp1" is sent to the mobile terminal 10 (S28). Consequently, a plan that matches the actual model name "mp1" is selected by the user and it is possible to provide the user with the flat-rate service according to the plan that matches the actual model name "mp1".

In the present embodiment, a plurality of pieces of temporary registration information can be stored in the temporary registration table 354. In a situation where the printer 100 is not near the user, the user can register any number of pieces of temporary registration information. User convenience is improved.

In the present embodiment, the processes from T20 in FIGS. 6 to T112 in FIG. 7 are executed when the reply that the printer 100 is near the user is inputted to the mobile terminal 10 (YES in T14 in FIG. 6). In these processes, since the printer 100 is near the user, the user only need to perform the obtaining operation in T50 in FIG. 6, and the user does not need to input the model name. On the other hand, when the reply that the printer 100 is not near the user is inputted to the mobile terminal 10 (NO in T14 of FIG. 6), the processes in FIGS. 8 and 9 are executed. Even in a situation where the printer 100 is not near the user, it is possible to proceed with the process for using the flat-rate service in advance. It is possible to provide the user with the appropriate process according to the user's situation.

Corresponding Relationships

The SP server 300, the memory 334, and the program 340 are an example of "server", "memory", and "computer-readable instructions", respectively. The mobile terminal 10 is an example of "terminal device". The printer 100 and the firmware 140 are an example of "specific function executing device" and "firmware", respectively. The temporary registration information in the temporary registration table 354 is an example of "usage information". The process in FIG. 8 and the main registration process in FIG. 9 are an example of "registering process" and "starting process", respectively. The onetime pass "xxxx" and the obtaining operation in T50 in FIG. 6 are an example of "specific information" and "predetermined operation", respectively. The model name selected in T236 in FIG. 8 and the model name "mp1" included in the device information DI1 received in S14 in FIG. 9 are an example of "first model name" and "second model name", respectively. S34 and S36 in FIG. 9 are examples of "service process". The plan selection screen SC5 displayed in T294 in FIG. 8 and the plan selected in T296 in FIG. 8 are an example of "first selection screen" and "first plan", respectively. The plan selection screen SC5 corresponding to the plan selection screen information sent in S28 and the plan indicated by the plan information received in S30 in FIG. 9 are an example of "second selection screen" and "second plan", respectively. The guide screen SC4 corresponding to the guide screen information sent in S18 is an example of "guide screen". The processes from T20 in FIGS. 6 to T122 in FIG. 7 are examples of "registration starting process". The model name selected in T236 in FIG. 8 is an example of "first attribute" and "first model name". The model name included in the device information DI1 received in S14 of FIG. 9 is an example of "second attribute" and "second model name". The instruction URL and the user ID included in the instruction URL are an example of "URL" and "predetermined information", respectively.

The process of FIG. 8 and the process of FIG. 9 are an example of the processes realized by "communicate with a terminal device so as to execute a registering process" and "communicate with the terminal device so as to execute a starting process", respectively.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

(Modification 1) The process of T306 of FIG. 8 may not be executed. In the present modification, for example, when the mobile terminal 10 receives the temporary registration completion notification from the SP server 300 in T308, the mobile terminal 10 may change the state of the mobile terminal 10 from a state in which the main registration process cannot be executed to a state in which the main registration process can be executed. For example, the state in which the main registration process cannot be executed may be a state in which a button for instructing execution of the main registration process is not displayed, and the state in which the main registration process can be executed may be a state in which the button is displayed. That is, the trigger for executing the "starting process" is not limited to the receipt of the command including the instruction URL, but may be, for example, receipt of a command sent in response to the selection of a predetermined button displayed on the mobile terminal 10 in accordance with the app 42.

(Modification 2) The processes from S26 to S30 of FIG. 9 may not be executed. In the present modification, "second selection screen information" may be omitted.

(Modification 3) The processes of S16 and S18 of FIG. 9 may not be executed. In the present modification, "guide screen information" may be omitted.

(Modification 4) The number of pieces of temporary registration information that one user can register may be one. In the present modification, "two or more pieces of usage information" may be omitted.

(Modification 5) In S22 of FIG. 9, the latest temporary registration information is selected. Instead of this, one piece of temporary registration information may be selected by the user among the one or more pieces of temporary registration information stored in association with the user ID "user1" identified by the instruction URL. In the present modification, "latest usage information" may be omitted.

(Modification 6) The processes of T12 and T14 of FIG. 6 may not be executed. In the present modification, the processes of T22 of FIGS. 6 to T112 of FIG. 7 are not executed, and the processes of FIG. 8 and FIG. 9 only need to be executed. In the present modification, the "registration starting process" may be omitted.

(Modification 7) The temporary registration information may not include at least one of the personal information and the payment information. The temporary registration information may not include the personal information nor the payment information, but may include at least one of the model name and service information. These different aspects of the temporary registration information described above are examples of "usage information".

(Modification 8) The "first attribute" and "second attribute" are not limited to the model name of the function executing device, but may be, for example, a scheme of a function that the function executing device has or a name of an engine (e.g., printing mechanism, scanning mechanism) that the function executing device has. Here, the scheme of the function is, for example, an inkjet scheme, a laser scheme, or a thermal scheme.

(Modification 9) The instruction URL may include a predetermined value for identifying the user ID "user1" instead of the user ID "user1". The predetermined value may be stored in the memory 334 in association with the user ID "user1". In the present modification, the predetermined value is an example of "predetermined information".

(Modification 10) The "specific information" is not limited to the onetime pass, but may be, for example, a serial number of the printer 100.

(Modification 11) The onetime pass may not be sent from the mobile terminal 10 to the SP server 300 in T66 of FIG. 7. For example, the onetime pass may be sent from the printer 100 to the SP server 300. Further, for example, the onetime pass may be sent from the printer 100 to another server and the SP server 300 may receive the onetime pass from the other server.

(Modification 12) In the above embodiment, the processes in FIG. 2 to FIG. 9 are realized by the CPUs (e.g., 32, 132, 232, 332) executing the programs (e.g., 40, 42, 140, 240, 340). Alternatively, any of the processes may be realized by hardware such as logic circuits.

What is claimed is:

1. A server configured to provide a service for a function executing device, the server comprising:
 a memory; and
 a controller,
 wherein the controller is configured to:
  communicate with a terminal device so as to execute a registering process for registering usage information for using the service, wherein
   in the registering process, the controller is configured to receive the usage information from the terminal device and store the usage information received from the terminal device in the memory, and the usage information includes a first attribute inputted to the terminal device by a user; and
  after the registering process has been executed, communicate with the terminal device so as to execute a starting process for starting the service, wherein
   in the starting process, the controller is configured to receive from the terminal device specific information for identifying a specific function executing device which is to be used in the service, the specific information is outputted from the specific function executing device triggered by a predetermined operation on the specific function executing device, and in the starting process, the controller is further configured to determine whether the first attribute matches a second attribute of the specific function executing device identified by the specific information received from the terminal device and execute a service process for starting a provision of the service to the user using the usage information stored in the memory in a case where it is determined that the first attribute matches the second attribute, wherein the service process is not executed in a case where it is determined that the first attribute does not match the second attribute.

2. The server according to claim 1, wherein
in the registering process, the controller is further configured to send the terminal device first selection screen information corresponding to a first selection screen, the first selection screen being for selecting a first plan among one or more plans for providing the service to the user, the one or more plans matching the first attribute,
the usage information includes the first plan selected by the user, and
in the starting process, the controller is further configured to, in a case where it is determined that the first attribute does not match the second attribute, send the terminal device second selection screen information corresponding to a second selection screen, the second selection screen being for selecting a second plan among the one or more plans that match the second attribute and execute the service process using the usage information including the second plan instead of the first plan.

3. The server according to claim 1, wherein
in the starting process, the controller is further configured to:
  determine whether a current version of a firmware of the specific function executing device is a specific version or higher; and
  send the terminal device guide screen information corresponding to a guide screen guiding a user to update the firmware in a case where it is determined that the current version of the firmware of the specific function executing device is not the specific version or higher.

4. The server according to claim 1, wherein
in the registering process, the controller is configured to receive two or more pieces of usage information from the terminal device and store the two or more pieces of usage information received from the terminal device in the memory, and
in the starting process, the controller is configured to execute the service process using one of the two or more pieces of usage information stored in the memory.

5. The server according to claim 4, wherein
the one of the two or more pieces of usage information is the latest usage information of the two or more pieces of the usage information.

6. The server according to claim 1, wherein
the controller is configured to execute the registering process in a case where a reply that the specific function executing device is not near the user is inputted to the terminal device, and the controller is further configured to execute a registration starting process for both of registration of the usage information and start of a provision of the service to the user in a case where a reply that the specific function executing device is near the user is inputted to the terminal device, wherein
in the registration starting process, the controller is configured to receive the specific information outputted from the specific function executing device triggered by the predetermined operation on the specific function executing device, store the usage information including the second attribute of the specific function executing device identified by the specific information in the memory, and execute the service process using the usage information stored in the memory.

7. The server according to claim 1, wherein
the usage information further includes at least one of personal information of the user and payment information for paying a fee of the service.

8. The server according to claim 1, wherein
the first attribute is a first model name, and
the second attribute is a second model name.

9. The server according to claim 1, wherein
in the registering process, the controller is configured to store the usage information in the memory in association with user identification information identifying the user, and
in the starting process, the controller is configured to determine whether the first attribute included in the usage information obtained from the memory by using the user identification information matches the second attribute identified by the specific information.

10. The server according to claim 9, wherein
in the registering process, the controller is further configured to send the terminal device a URL including predetermined information for identifying the user identification information stored in the memory, and
in the starting process, the controller is further configured to receive a command including the URL from the terminal device and obtain from the memory the usage information stored in association with the user identification information identified by the predetermined information included in the command.

11. A communication system comprising a server configured to provide a service for a function executing device, the function executing device and a terminal device, wherein
the server is configured to communicate with the terminal device so as to execute a registering process for registering usage information for using the service, wherein
in the registering process, the server is configured to receive the usage information from the terminal device and store the usage information received from the terminal device in the memory, and the usage information includes a first attribute inputted to the terminal device by a user,
the specific function executing device is configured to output specific information triggered by a predetermined operation on the specific function executing device in a case where a predetermined operation is executed on the specific function executing device after the registering process has been executed, and
the server is configured to communicate with the terminal device so as to execute a starting process for starting the service after the registering process has been executed, wherein
in the starting process, the server is configured to receive from the terminal device specific information for identifying a specific function executing device which is to be used in the service, the specific information is outputted from the specific function executing device triggered by a predetermined operation on the specific function executing device, and in the starting process, the server is further configured to determine whether the first attribute matches a second attribute of the specific function executing device identified by the specific information received from the terminal device and execute a service process for starting a provision of the service to the user using the usage information stored in the memory in a case where it is determined that the first attribute matches the second attribute, wherein the service process is not executed in a case where it is determined that the first attribute does not match the second attribute.

12. A non-transitory computer-readable recording medium storing computer-readable instructions for a server configured to provide a service for a function executing device, wherein the server comprises a processor and a memory, and
the computer-readable instructions, when executed by a processor of the server, cause the server to:
communicate with a terminal device so as to execute a registering process for registering usage information for using the service, wherein
the computer-readable instructions, when executed by a processor of the server, cause the server to:
in the registering process, receive the usage information from the terminal device and store the usage information received from the terminal device in the memory, and the usage information includes a first attribute inputted to the terminal device by a user; and
after the registering process has been executed, communicate with the terminal device so as to execute a starting process for starting the service, wherein
the computer-readable instructions, when executed by a processor of the server, cause the server to:
in the starting process, receive from the terminal device specific information for identifying a specific function executing device which is to be used in the service, the specific information is outputted from the specific function executing device triggered by a predetermined operation on the specific function executing device, and in the starting process, determine whether the first attribute matches a second attribute of the specific function executing device identified by the specific information received from the terminal device and execute a service process for starting a provision of the service to the user using the usage information stored in the memory in a case where it is determined that the first attribute matches the second attribute, wherein the service process is not executed in a case where it is determined that the first attribute does not match the second attribute.

13. A control method for a server configured to provide a service for a function executing device, wherein the server comprises a memory, and
the control method comprises;
communicating with a terminal device so as to execute a registering process for registering usage information for using the service, wherein
in the registering process, the server receives the usage information from the terminal device and store the usage information received from the terminal device in the memory, and the usage information includes a first attribute inputted to the terminal device by a user; and
after the registering process has been executed, communicating with the terminal device so as to execute a starting process for starting the service, wherein
in the starting process, the server receives from the terminal device specific information for identifying a specific function executing device which is to be used in the service, the specific information is outputted from the specific function executing device triggered by a predetermined operation on the specific function executing device, and
in the starting process, the server further determines whether the first attribute matches a second attribute of the specific function executing device identified by the specific information received from the terminal device and execute a service process for starting a provision of the service to the user using the usage information stored in the memory in a case where it is determined that the first attribute matches the second attribute, wherein the service process is not executed in a case where it is determined that the first attribute does not match the second attribute.

* * * * *